(12) United States Patent  (10) Patent No.: US 9,179,311 B2
Peirce et al.  (45) Date of Patent: Nov. 3, 2015

(54) SECURING VEHICLE SERVICE TOOL DATA COMMUNICATIONS

(71) Applicant: GM Global Technology Operations LLC, Detroit, MI (US)

(72) Inventors: Kenneth L. Peirce, Grosse Pointe Farms, MI (US); Ervin Hoxha, Troy, MI (US); Joseph E. Ploucha, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 14/046,272

(22) Filed: Oct. 4, 2013

(65) Prior Publication Data

US 2015/0100197 A1  Apr. 9, 2015

(51) Int. Cl.
*H04W 12/08* (2009.01)
*H04W 12/06* (2009.01)
*H04L 9/00* (2006.01)
*H04L 9/32* (2006.01)

(52) U.S. Cl.
CPC .............. *H04W 12/08* (2013.01); *H04W 12/06* (2013.01); *H04L 9/006* (2013.01); *H04L 9/3263* (2013.01); *H04L 2209/84* (2013.01)

(58) Field of Classification Search
CPC ..... H04L 9/006; H04L 9/0643; H04L 9/3263; H04L 9/3271; H04L 2209/84; H04L 63/0823; H04L 67/125; G01M 17/00; G01M 17/007; G07C 5/0808; G07C 5/008; G01R 31/07
See application file for complete search history.

(56) References Cited

U.S. PATENT DOCUMENTS

| | | | |
|---|---|---|---|
| 7,209,813 B2* | 4/2007 | Namaky | 701/33.2 |
| 7,228,420 B2* | 6/2007 | Dabbish et al. | 713/170 |
| 2002/0023223 A1* | 2/2002 | Schmidt et al. | 713/187 |
| 2002/0120856 A1* | 8/2002 | Schmidt et al. | 713/193 |
| 2003/0159041 A1* | 8/2003 | Yokota et al. | 713/168 |
| 2008/0148374 A1* | 6/2008 | Spaur et al. | 726/6 |
| 2009/0249074 A1* | 10/2009 | Madhavan et al. | 713/176 |
| 2012/0010775 A1* | 1/2012 | Chenn | 701/31.5 |
| 2012/0252364 A1* | 10/2012 | Inabathuni et al. | 455/41.2 |
| 2012/0322377 A1* | 12/2012 | Alrabady | 455/41.2 |
| 2013/0304306 A1* | 11/2013 | Selkirk et al. | 701/31.4 |
| 2014/0279230 A1* | 9/2014 | Bertosa et al. | 705/26.41 |

* cited by examiner

*Primary Examiner* — Michael J Zanelli
(74) *Attorney, Agent, or Firm* — Anthony Luke Simon; Reising Ethington P.C.

(57) ABSTRACT

A system and method of securely communicating information between a vehicle and a central facility includes receiving at a vehicle diagnostic tool a challenge query from the vehicle; establishing a wireless connection between the vehicle diagnostic tool and a central facility; transmitting the challenge query from the vehicle diagnostic tool to the central facility via the wireless connection; receiving at the vehicle diagnostic tool a response to the challenge query via the wireless connection; and accessing one or more vehicle modules on the vehicle using the received response to the challenge query.

20 Claims, 2 Drawing Sheets

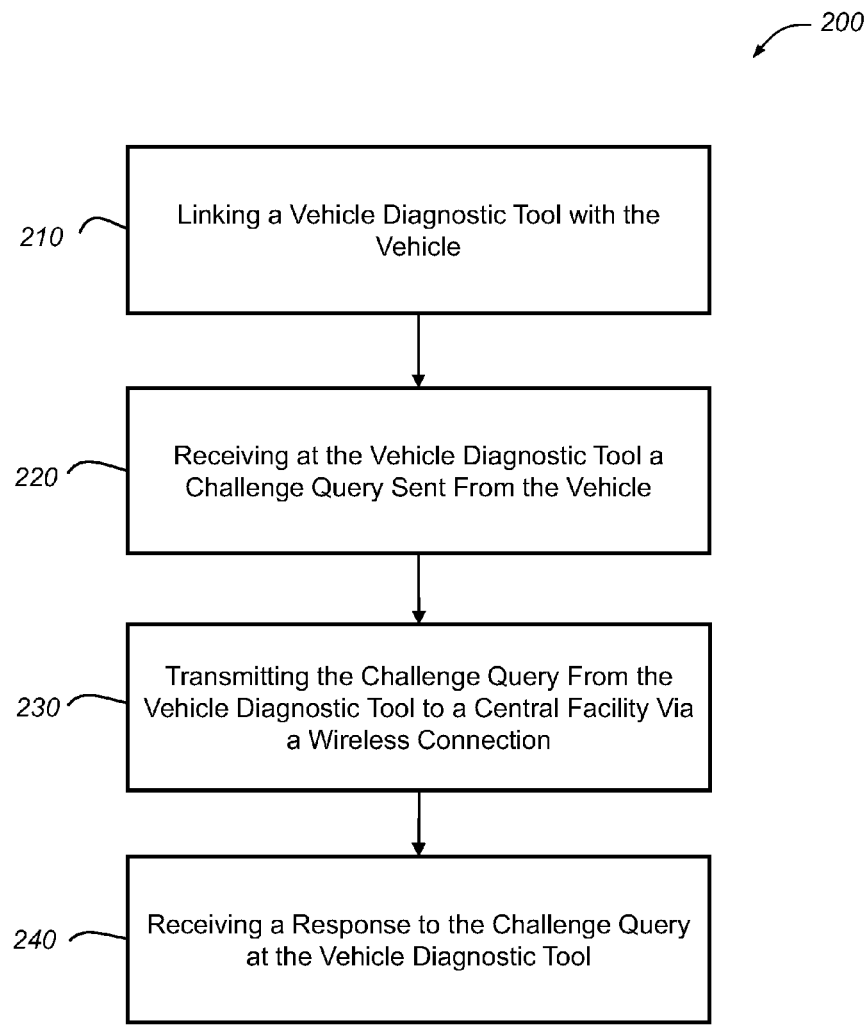

SECURING VEHICLE SERVICE TOOL DATA COMMUNICATIONS

TECHNICAL FIELD

The present invention relates to vehicle service or diagnostic tools and how the tools communicate with the vehicle and other devices.

BACKGROUND

The performance and operation of a modern vehicle is often monitored using vehicle diagnostic tools. These tools can receive information from the vehicle and use the information to generate a diagnosis that is understandable by professionals servicing the vehicle. In one example, a vehicle technician can use the vehicle diagnostic tool to access any diagnostic trouble codes (DTCs) that the vehicle has generated and possibly interpret the DTCs in a way that explains a vehicular problem to the technician. While vehicle diagnostic tools can be helpful for servicing vehicles, it can also be helpful to control access to the information carried by the vehicle or its various modules.

SUMMARY

According to an embodiment, there is provided a method of securely communicating information between a vehicle and a central facility. The steps include receiving at a vehicle diagnostic tool a challenge query from the vehicle; establishing a wireless connection between the vehicle diagnostic tool and a central facility; transmitting the challenge query from the vehicle diagnostic tool to the central facility via the wireless connection; receiving at the vehicle diagnostic tool a response to the challenge query via the wireless connection; and accessing one or more vehicle modules on the vehicle using the received response to the challenge query.

According to another embodiment, there is provided a method of securely communicating information between a vehicle and a central facility. The steps include communicatively linking a vehicle diagnostic tool with the vehicle; attempting to communicate with one or more vehicle modules located on the vehicle using the vehicle diagnostic tool; receiving at the vehicle diagnostic tool a challenge query sent from the vehicle; transmitting the challenge query using a separate wireless device to a central facility; receiving a response to the challenge query at the vehicle diagnostic tool from the separate wireless device; and accessing information from one or more vehicle modules using the vehicle diagnostic tool and the response to the challenge query.

According to yet another embodiment, there is provided a system of securely communicating information between a vehicle and a central facility. The system comprises a vehicle diagnostic tool that includes a processor, a memory device, and one or more communication ports for sending and receiving information between the vehicle and a separate wireless device capable of communicating via one or more cellular communication protocols, wherein the vehicle diagnostic tool communicates a challenge query and a response to the challenge query between the vehicle and a central facility.

BRIEF DESCRIPTION OF THE DRAWINGS

One or more embodiments of the invention will hereinafter be described in conjunction with the appended drawings, wherein like designations denote like elements, and wherein:

FIG. 2 is a flow chart depicting an embodiment of a method of securely communicating information between a vehicle and a central facility.

DETAILED DESCRIPTION OF THE ILLUSTRATED EMBODIMENTS

Figure 1:
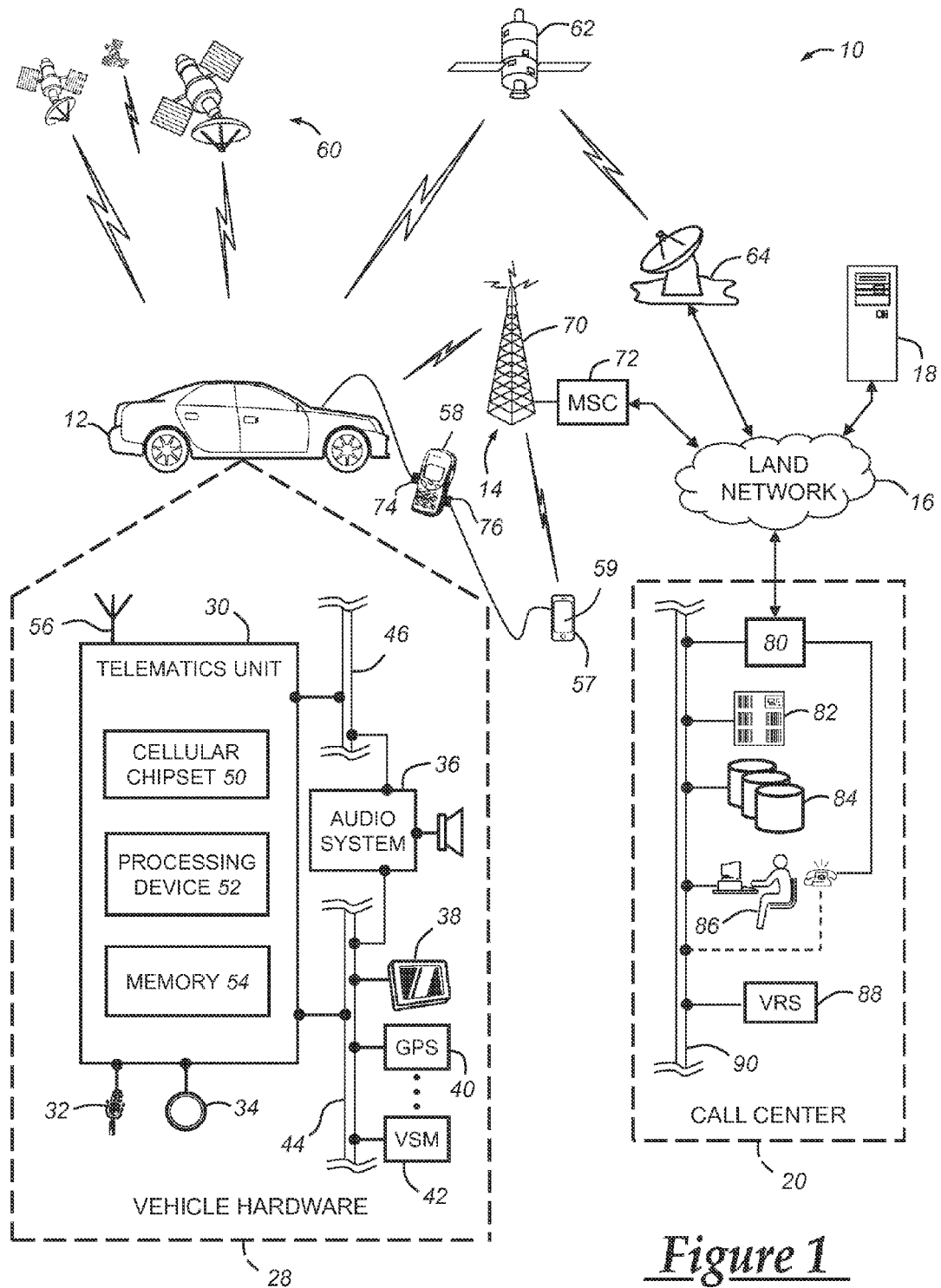
FIG. 1 is a block diagram depicting an embodiment of a communications system that is capable of utilizing the method and system disclosed herein.

The method and system described below relates to vehicle service or diagnostic tools and how the tools communicate with the vehicle and central facilities, such as a vehicle manufacturer. Vehicle technicians can access a vehicle module, such as an engine control module, using a vehicle diagnostic tool. When the vehicle diagnostic tool connects with the vehicle module it can communicate a challenge query that regulates access to the module. Currently, vehicle diagnostic tools are often used at facilities with Internet access. In that case, the vehicle diagnostic tool can send the challenge query along with the identity of the sender via the Internet (e.g., a land network) to a central facility. There, the central facility can determine whether the received sender identity is authorized to access the vehicle module and, if so, the central facility sends a response to the challenge query to the vehicle diagnostic tool. The vehicle diagnostic tool can then use the response to the challenge query to access information held and/or gathered by the vehicle module.

However, if the vehicle technician uses the vehicle diagnostic tool at a facility that cannot communicate via the Internet, then access to the vehicle system modules may be blocked even though a user may be authorized for access. In one solution, it is possible to encode all responses to the challenge queries on a memory device, such as a CD-ROM or a USB drive. But doing so would involve relinquishing control of the challenge query responses and opening the possibility that unauthorized individuals may gain access to the challenge query responses.

To provide the challenge query responses to vehicle diagnostic tools that are without Internet access, it is possible to provide cellular communication capability to vehicle diagnostic tools such that both the challenge queries and responses to challenge queries can be communicated wirelessly, such as via a cellular communication system. That is, the vehicle diagnostic tools can include the ability to communicate with a cellular communication system, like the wireless carrier system discussed below, or that vehicle diagnostic tools can be communicatively linked with a separate wireless device (e.g., a smartphone) that can wirelessly transmit data via cellular protocols or other wireless techniques. The challenge queries and responses to challenge queries can be communicated between the vehicle diagnostic tool and the central facility using data packets and can be included with text messages, such as short message service (SMS) messages.

Broadly speaking, the vehicle diagnostic tool can be connected to the vehicle and perform a diagnostic test of vehicle problems and/or operation. One or more vehicle modules can respond to the diagnostic test with one or more challenge queries, which the vehicle diagnostic tool can include with a text message along with the sender's identity and send the message to the central facility. The central facility can verify that the sender is authorized to access the particular vehicle and send the one or more responses to the challenge queries to the vehicle diagnostic tool (or separate wireless device that can pass the responses to the tool). The vehicle diagnostic tool can then send the responses to the vehicle or vehicle modules that will permit access based on the responses.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a separate wireless device, such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Droid™ manufactured by Motorola, Inc. as well as others. These and other similar devices may be used or considered as a type of separate wireless device for the purposes of the method described herein. While the smart phone 57 is described with the method below, it should be appreciated that other similar and/or simpler cellular telephones can be successfully substituted for the smart phone 57 to carry out the method/system described herein.

The vehicle diagnostic tool 58 is a device that communicatively links to the vehicle 12 and interacts with one or more vehicle modules 42 thereby gathering data and/or performing diagnostics tests on vehicle operations and/or problems. The vehicle diagnostic tool 58 can include On-Board Diagnostics (OBD) II tools, such as a GM Tech-2 device, a GM Multiple Diagnostics Interface (MDI), a generic SAE J2534 device, or similar device. The vehicle diagnostic tool 58 can include one or more communication ports for transmitting data via a wired or wireless connection. For instance, the vehicle diagnostic tool 58 can include an RS232 port 74 for communicatively linking the tool 58 via wire to an OBD II connector on the vehicle 12, which can be used to send and receive data between the tool 58 and one or more vehicle modules 42 via the communications bus 44. In addition, depending on the capabilities of the vehicle 12, the vehicle diagnostic tool 58 can wirelessly communicate data or information with the vehicle 12 as a networked device discussed above.

Wired and wireless connections between the vehicle diagnostic tool 58 and the smart phone 57 are possible as well. In one example, the smart phone 57 can be connected via wire from its data connection to a port 76 on the vehicle diagnostic tool 58, such as the RS232 or RS485 port. This is shown in FIG. 1. However, the vehicle diagnostic tool 58 may also communicate via a short range wireless link as well. For example, the vehicle diagnostic tool 58 can include one or more short-range wireless transceivers for wirelessly communicating data. That is, the vehicle diagnostic tool 58 can be wirelessly paired with the smart phone 57 using wireless protocols that are known, such as Bluetooth. Regardless of whether the link between the smart phone 57 and the vehicle diagnostic tool 58 is wired or wireless, configurations using the smart phone 57 along with the vehicle diagnostic tool 58 can create a tethering arrangement so that existing vehicle diagnostic tools 58 can communicate via the wireless carrier system 14 without modifying the tool 58. This will be discussed in more detail below.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites.

From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method

Turning now to FIG. 2, there is shown a method 200 of securely communicating information between the vehicle 12 and a central facility. The method 200 begins at step 210 by communicatively linking the vehicle diagnostic tool 58 with the vehicle 12. As noted above, such a linking can be wired or wireless. In one example, the vehicle diagnostic tool 58 can be linked via wire to the OBD II connector at the vehicle 12 via an RS232 or RS485 port used by the tool 58. Or in another example, the vehicle diagnostic tool 58 can wirelessly link with the vehicle telematics unit 30 and communicate with the vehicle 12 over the wireless link in much the same way that occurs when a wired connection is used. The vehicle diagnostic tool 58 can then attempt to communicate with one or more vehicle modules 42 located on the vehicle 12 as part of gathering data and/or performing vehicle diagnostic tests. The method 200 proceeds to step 220.

At step 220, a challenge query is sent from the vehicle 12 and received at the vehicle diagnostic tool 58. Once the vehicle module(s) 42 receive communications from the vehicle diagnostic tool 58, the module(s) 42 can block access/communication of data or execution of any programs until the tool 58 successfully provides an answer or response to the challenge query. For instance, the vehicle module 42 can receive an instruction from the vehicle diagnostic tool 58 and in response the module 42 can access a file containing challenge queries stored at the module 42 itself. Or the module 42 can request a challenge query stored in the memory device of the vehicle telematics unit 30 via the communication bus 44 upon receiving the instruction from the vehicle diagnostic tool 58. The vehicle telematics unit 30 can then access one of a number of challenge queries stored at the unit 30 and either send the query to the vehicle module 42, which provides the challenge query to the vehicle diagnostic tool 58, or send the query directly to the vehicle diagnostic tool 58 over the communication bus 44. In one example, the challenge query can be an encrypted hash that is decoded at a central facility, such as a back office (e.g., computer 18), using a private key. In one example, the challenge query can be encrypted using a private key belonging to the module 42, a nonce and its copy of the back office certificate or public key. The computer 18 can then decrypt the challenge query using its private key, the nonce, and the certificate corresponding to the module 42 in its database or a module 42 certificate that accompanies the challenge query. The message carrying the challenge query can also be digitally signed by the module 42 to attest to the challenge query message's origin. The digital signature can be a cryptographic hash that is encrypted by the module 42 and can include all the material in the challenge query message except for the digital signature itself.

The challenge query can be sent using an electronic control unit (ECU) carried by the vehicle 12, such as the electronic processing device 52. It should also be appreciated that the challenge query can include a unique identifier of the ECU and/or a unique message identifier, which can be implemented in a variety of ways. For instance, the unique identifier of the ECU can comprise a character string representing the serial number of the ECU and the model number of the ECU, whereas the unique message identifier can include the ECU serial number along with a UTC timestamp. The unique identifier can be included in the implicit certificate or Qu-Vanstone certificate of the ECU. Apart from these certificates, the ECU can also maintain a copy of a public key certificate that represents a back office facility, such as an X.509 certificate. The back office facility maintains the only other private key corresponding to the copy. It should be appreciated that other challenge queries can be implemented as will be known to those in the cryptographic arts. The method 200 then proceeds to step 230.

At step 230, the challenge query is transmitted from the vehicle diagnostic tool 58 to a central facility via a wireless connection. As noted above, the central facility can be carried out using a back-office facility (e.g., the computer 18) or the call center 20. This implementation will be described using the computer 18 as the central facility even though it should be appreciated that other central facilities are possible. And depending on how the vehicle diagnostic tool 58 is configured, the challenge query can be sent from the smart phone 57 or the tool 58 itself. That is, it is possible to transmit the challenge query from the vehicle diagnostic tool 58 if it is equipped to do so (e.g., it has a cellular chipset or other communications hardware). However, it is also possible to transmit the challenge query using a separate wireless device, such as the smart phone 57.

In one implementation, the vehicle diagnostic tool 58 can include a transceiver (e.g., a cellular chipset) for communicating data. The transceiver carried by the vehicle diagnostic tool 58 can communicate directly with the computer 18 using the wireless carrier system 14. However, it is also possible to configure existing vehicle diagnostic tools 58 that do not have transceivers or other communications hardware so that they can communicate with the computer 18. To do so, the vehicle diagnostic tool 58 can be communicatively linked with the smart phone 57 either via wire or wireless link. For instance, the smart phone 57 could be linked to the vehicle diagnostic tool 58 via a wired adapter that connects with an RS232 or RS485 port on the tool 58. Or the vehicle diagnostic tool 58 can be linked to the smart phone 57 via a short-range wireless link, such as can be carried out using the Bluetooth protocol. In other words, the smart phone 57 can be tethered to the vehicle diagnostic tool 58 either wirelessly or via a wire and the smart phone 57 can carry out the communication function on behalf of the tool 58. In either configuration, the smart phone 57 can use a dedicated software application (commonly referred to as an "app") to facilitate communications of data, such as the challenge queries and responses to those queries, between the vehicle diagnostic tool 58 and the computer 18. And it should also be appreciated that a simpler cellular telephone can be substituted for the smart phone 57 to carry out method 200. The method 200 proceeds to step 230.

The challenge query can be sent in the form of a text message, such as an SMS message. Regardless of whether the vehicle diagnostic tool 58 sends the challenge query or the tool 58 communicates the challenge query to the smart phone 57 for ultimate transmission, the challenge query can be included in a text message. SMS messaging is a common text message format that can be used for sending the challenge query. A benefit of using SMS to communicate the challenge query is that SMS messaging is often available when high-speed cellular data connections are not. However, it should be understood that the challenge query can be sent not only using a standard SMS message but also an encrypted SMS message. The use of encrypted SMS messages often includes the use of a public key encryption scheme that uses both public and private keys to encrypt SMS messages. While this implementation is described in terms of a public-key system, it should also be appreciated that a private-key system can alternatively be implemented. The encryption scheme can use X.509 certificates, compact certificates, or implicit certificates that verify the authenticity of the public keys used as part of the encryption scheme. In one example, the challenge query can be encrypted using a nonce that is included in the SMS message, the private key of the ECU, and a public key of the back office facility. In this example, the encryption scheme can provide privacy for the entire contents of the SMS message as well as providing a digital signature for the SMS message that identifies the specific vehicle 12 and/or ECU of the vehicle 12 to the back office facility (e.g., computer 18).

While standard X.509 certificates can be used, other more compact X.509 certificates can also be used. In one example, the compact X.509 certificates include all the information found in standard X.509 certificates except that the signature algorithm, the issuer, and the subject can be omitted. Rather than including the signature algorithm, the issuer, and the subject in the compact X.509 certificate this information can be separately provided to the vehicle 12 (e.g., at the vehicle telematics unit 30) where it can be stored. A more complete explanation of how compact X.509 certificates function can be found in U.S. patent application Ser. No. 12/059,758 that has matured into U.S. Pat. No. 8,327,146 the contents of which are incorporated by reference. And other encryption schemes are also possible. For instance, the text messages can be encrypted using Menezes-Qu-Vanstone protocols as well. The method 200 proceeds to step 240.

At step 240, a response to the challenge query is received at the vehicle diagnostic tool 58. To receive the response at the vehicle diagnostic tool 58, the challenge query is sent to and received by the computer 18. The computer 18 can then determine whether the entity sending the challenge query is authorized to access vehicle modules 42 and, if so, can provide a valid response to the vehicle diagnostic tool 58 that permits such access. The text message or SMS message sent to the computer 18 can include not only the challenge query but also a type of identifier that the computer 18 can use to determine whether or not the sender of the text message is authorized to access vehicle modules. In one example, the computer 18 can access a database of authorized users and compare the received identifier to determine if access is authorized. After receiving the SMS message, the computer 18 can compare the received challenge query with a copy of that query maintained in a database. If so, the computer 18 can provide a response to the challenge query that after being received by the vehicle 12 can grant access to vehicle modules 42. Otherwise, the response is sent to the vehicle diagnostic tool 58 with an error message.

The response can be implemented in a variety of ways. For instance, the computer 18 can store a number of responses that each correlate to a challenge query. When the computer 18 receives a challenge query, the computer 18 can identify it and based on that identification retrieve a corresponding response the vehicle 12 will recognize as permitting access. When the computer 18 receives a challenge query, the computer 18 can create the response by encoding it with a private key. The response can be received by the smart phone 57 and communicated through the vehicle diagnostic tool 58 to the vehicle 12 or the vehicle diagnostic tool 58 can receive the response and pass it to the vehicle 12 as discussed above. In one implementation, it is possible to encrypt the response in a second SMS message with the private key stored at the computer 18, a public key of the ECU or vehicle 12, and a nonce. Apart from the encryption, the second SMS message can also include with it a digital signature, which can be a cryptographic hash of the content of the second SMS message. The cryptographic hash can be created using the private key stored at the computer 18 and can be used to determine that the response was in fact issued by the computer 18. If a public/private key scheme is used, then the implicit certificate of the computer 18 can be included in the second SMS message.

Once received, the response can be verified by the vehicle telematics unit 30 or a vehicle module 42 itself. For example, when the second SMS message is received at the vehicle 12, the message can be decoded using a public key associated with the computer 18 as well as the private key of the vehicle 12 or ECU. The public key of computer 18 may be delivered by the second SMS message and could be contained in the implicit certificate of computer 18. When the vehicle 12 decodes the second SMS message, the vehicle 12 can determine that the user of the vehicle diagnostic tool 58 is authorized to access the vehicle modules 42. It should also be appreciated that rather than the vehicle 12 decoding the second SMS message, the vehicle diagnostic tool 58 can be used to decode the second SMS message instead in a similar way. Upon verifying that the vehicle diagnostic tool 58 and/or the user of the tool 58 is authorized to access data or perform diagnostic tests, information from one or more vehicle modules 42 can be accessed using the vehicle diagnostic tool 58. The use of responses that are encoded with the private/public keys or implicit certificates of the vehicle 12/ECU can prevent the misuse of challenge responses intended for one vehicle but used on a different vehicle instead. Also, either a time stamp or unique ECU generated transaction ID can be incorporated into both the challenge request and challenge response messages, which can prevent messages from being replayed. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of securely accessing a vehicle module within a vehicle, comprising the steps of:
   (a) receiving at a vehicle diagnostic tool a challenge query from the vehicle;
   (b) establishing a wireless connection between the vehicle diagnostic tool and a central facility;
   (c) transmitting the challenge query from the vehicle diagnostic tool to the central facility via the wireless connection;
   (d) receiving at the vehicle diagnostic tool a response to the challenge query sent from the central facility via the wireless connection;
   (e) sending the received response to the vehicle;
   (f) obtaining authorization from the vehicle for the vehicle diagnostic tool to access one or more vehicle modules based on the response; and
   (g) accessing the one or more vehicle modules from the vehicle diagnostic tool based on the authorization obtained from the vehicle.

2. The method of claim 1, further comprising establishing the wireless connection using a separate wireless device.

3. The method of claim 2, further comprising establishing the wireless connection using a smart phone.

4. The method of claim 1, wherein the vehicle diagnostic tool includes a wireless transceiver.

5. The method of claim 4, wherein the wireless transceiver is able to communicate with a wireless carrier system using a cellular protocol.

6. The method of claim 1, further comprising transmitting the challenge query using a text message.

7. The method of claim 1, further comprising transmitting the challenge query or receiving the response using a compact X.509 certificate.

8. The method of claim 1, further comprising the step of creating the challenge query or response using an encrypted hash.

9. A method of securely accessing a vehicle module within a vehicle, comprising the steps of:
   (a) communicatively linking a vehicle diagnostic tool with the vehicle;
   (b) attempting to communicate with one or more vehicle modules located on the vehicle using the vehicle diagnostic tool;
   (c) receiving at the vehicle diagnostic tool a challenge query sent from the vehicle;
   (d) transmitting the challenge query using a separate wireless device to a central facility;
   (e) receiving a response to the challenge query sent from the central facility at the vehicle diagnostic tool from the separate wireless device;
   (f) sending the received response to the vehicle;
   (g) obtaining authorization from the vehicle for the vehicle diagnostic tool to access one or more vehicle modules based on the response; and
   (h) accessing information from the one or more vehicle modules from the vehicle diagnostic tool based on the authorization obtained from the vehicle.

10. The method of claim 9, wherein the separate wireless device is a smart phone.

11. The method of claim 9, wherein the vehicle diagnostic tool is communicatively linked to the separate wireless device via a wired connection.

12. The method of claim 9, wherein the vehicle diagnostic tool is communicatively linked to the separate wireless device via a short-range wireless connection.

13. The method of claim 9, wherein the challenge query is transmitted using a text message.

14. The method of claim 9, wherein the challenge query is transmitted or the response is received using a compact X.509 certificate.

15. The method of claim 9, further comprising the step of creating the challenge query or response using an encrypted hash.

16. A system of securely accessing a vehicle module within a vehicle, comprising:
    a vehicle diagnostic tool that includes one or more communication ports for sending and receiving information between the vehicle and a separate wireless device capable of communicating with a central facility via one or more cellular communication protocols, wherein the vehicle diagnostic tool communicates with the vehicle and wireless device to exchange a challenge query and a response to the challenge query between the vehicle and the central facility, wherein the vehicle diagnostic tool obtains authorization from the vehicle to access one or more vehicle modules after receiving and sending the response to the challenge query to the vehicle.

17. The system of claim 16, wherein the one or more communication ports further comprise an RS232 port or an RS485 port.

18. The system of claim 16, wherein the one or more communication ports is a wireless transceiver.

19. The system of claim 18, wherein the wireless transceiver establishes a short-range wireless link between the vehicle diagnostic tool and the separate wireless device.

20. The system of claim 16, wherein the challenge query or the response are communicated between the vehicle and the central facility via a separate wireless device.

\* \* \* \* \*